United States Patent
Persson

(10) Patent No.: US 7,751,642 B1
(45) Date of Patent: Jul. 6, 2010

(54) METHODS AND DEVICES FOR IMAGE PROCESSING, IMAGE CAPTURING AND IMAGE DOWNSCALING

(75) Inventor: Erik Persson, Lund (SE)

(73) Assignee: Arm Limited, Cambridge (GB)

( * ) Notice: Subject to any disclaimer, the term of this patent is extended or adjusted under 35 U.S.C. 154(b) by 901 days.

(21) Appl. No.: 11/434,803

(22) Filed: May 17, 2006

Related U.S. Application Data

(60) Provisional application No. 60/681,998, filed on May 18, 2005.

(51) Int. Cl.
*G06K 9/40* (2006.01)
(52) U.S. Cl. .............. 382/266; 382/254; 382/255; 348/221.1; 348/252
(58) Field of Classification Search .......... 382/167, 382/169, 190, 262, 261, 274; 348/222, 266, 348/272, 240, 300
See application file for complete search history.

(56) References Cited

U.S. PATENT DOCUMENTS

| | | | | |
|---|---|---|---|---|
| 5,355,328 A | * | 10/1994 | Arbeiter et al. ............. | 708/313 |
| 5,629,734 A | * | 5/1997 | Hamilton et al. .......... | 348/222.1 |
| 5,778,106 A | * | 7/1998 | Juenger et al. ............... | 382/275 |
| 6,167,154 A | * | 12/2000 | Renaud et al. .............. | 382/174 |
| 7,012,719 B1 | * | 3/2006 | Takahashi .................... | 358/474 |
| 7,082,218 B2 | * | 7/2006 | Pollard et al. ............... | 382/167 |
| 7,088,392 B2 | * | 8/2006 | Kakarala et al. ............. | 348/272 |
| 7,154,514 B2 | * | 12/2006 | Chang et al. ................. | 345/667 |
| 2002/0034337 A1 | * | 3/2002 | Shekter ....................... | 382/275 |
| 2003/0044088 A1 | * | 3/2003 | Wright ........................ | 382/300 |
| 2003/0052981 A1 | * | 3/2003 | Kakarala et al. ............. | 348/272 |

* cited by examiner

*Primary Examiner*—Andrew W Johns
*Assistant Examiner*—Jason Heidemann
(74) *Attorney, Agent, or Firm*—Birch, Stewart, Kolasch & Birch, LLP

(57) ABSTRACT

An image processing method comprises receiving a raw color image as produced by an image sensor. A color image having a plurality of pixels is generated by processing raw image data from said raw color image, wherein pixels for which color values are absent in said raw image data are assigned color values derived from present color values in said raw image data. A sharpening term is generated by processing raw image data from said raw color image. Then, an improved color image is produced by combining said color image with said sharpening term. The raw color image may be a Bayer image, and the image processing method may be implemented in a cost and power efficient integrated circuit using limited memory.

25 Claims, 10 Drawing Sheets

METHODS AND DEVICES FOR IMAGE PROCESSING, IMAGE CAPTURING AND IMAGE DOWNSCALING

CROSS-REFERENCE TO RELATED APPLICATIONS

The present application claims the benefit of U.S. provisional patent application No. 60/681,998, filed on May 18, 2005, which is hereby incorporated by reference.

TECHNICAL FIELD

This invention relates to processing of raw color images, and more particularly to an image processing method, an image processing device, as well as an associated integrated circuit, computer program product and image capturing device. The invention also relates to an image downscaling method and an associated image downscaling device, integrated circuit and image capturing device.

BACKGROUND OF THE INVENTION

Many image sensors of today are so-called Bayer sensors. A Bayer sensor outputs an image matrix, in which color channels (red, green and blue) are sub-sampled in a way that every other row contains pixels with red (R) and green (G1) channel intensity values and the remaining rows contain pixels with blue (B) and green (G2) channel intensity values. The intensity values of the individual color channels will be referred to as color values from here on. Consequently, every pixel contains only one color value, as indicated in the schematic image below:

$$\begin{pmatrix} R & G_1 & R & G_1 & R & G_1 & R & \cdots \\ G_2 & B & G_2 & B & G_2 & B & G_2 & \cdots \\ R & G_1 & R & G_1 & R & G_1 & R & \cdots \\ G_2 & B & G_2 & B & G_2 & B & G_2 & \cdots \\ R & G_1 & R & G_1 & R & G_1 & R & \cdots \\ G_2 & B & G_2 & B & G_2 & B & G_2 & \cdots \\ R & G_1 & R & G_1 & R & G_1 & R & \cdots \\ \cdots & \cdots & \cdots & \cdots & \cdots & \cdots & \cdots & \cdots \end{pmatrix}$$

In order to achieve an image with every pixel having color values for all three color channels, i.e. a full RGB (Red, Green, Blue) image, some sort of image processing or reconstruction must be made. Usually, a missing color value in a pixel is determined on the basis of the color values in the nearby pixels, e.g. a pixel in position (X,Y) having only a red value may take the blue value in the pixels placed in the positions (X−1,Y−1), (X−1,Y+1), (X+1,Y+1) and (X+1,Y−1) into consideration when determining the blue value for the present pixel placed in position (X,Y), and in a similar way the green value is determined. This type of operation is often referred to as color interpolation.

Color interpolation works fine when the color values vary smoothly between adjacent pixels, but at sharp edges, i.e. when the color values change drastically between adjacent pixels, care must be taken to avoid unwanted artifacts.

One type of artifact is blurring of sharp edges. Another type of artifact is the so-called zipper effect, where a pattern of alternating low and high intensity values is produced along horizontal and vertical edges. Yet another type of artifact is the appearance of so-called color fringes, which arise when edges are reproduced differently among the color channels. Hence, colored fringes are produced near sharp edges. Still another type of artifact is the so-called maze pattern, caused by incorrectly detected edges in the presence of noise or difference in response between G1 and G2 pixel elements.

One known solution for reducing blurring and color fringes is to interpolate inter-channel differences, rather than interpolating the color channels individually. However, this method produces zipper artifacts.

Another known solution for reducing blurring, zipper effects and color fringes is to determine whether there is a vertical or horizontal structure in the image, which is done by determining vertical and horizontal gradient values in the image. Based on the structure of the image the interpolation is adjusted in order to achieve a better image. However, this method produces maze artifacts and poorly reproduces diagonal structures.

Although some of the aforementioned artifacts are mitigated by the above mentioned methods, these methods are not optimal. In particular, they can not simultaneously eliminate or at least significantly reduce blurring, zipper artifacts, color fringes and maze artifacts.

SUMMARY OF THE INVENTION

In view of the above, an objective of the invention is to solve or at least reduce the problems discussed above. In particular, an objective is to present an improved color interpolation solution, inter alia for reducing the zipper and maze artifacts caused by deviations in pixel response among color channels, such as G1 and G2 in a Bayer image. Another objective is to achieve a less noise-sensitive detection of orientation directions when performing color interpolation. Still an objective is to be able to accurately reproduce diagonal structures in the image. Yet an objective is to provide a solution particularly suitable for a cost and power efficient hardware realization using limited memory.

Furthermore, an objective is to produce an image that is perceived as sharp, while not amplifying noise. Finally, an objective is also to scale the image to a smaller size.

Generally, the objectives above may at least partly be achieved by the solutions defined in the attached independent claims.

More particularly, a first aspect of the invention is an image processing method, comprising: receiving a raw color image, as produced by an image sensor; generating a color image having a plurality of pixels by processing raw image data from said raw color image, wherein pixels for which color values are absent in said raw image data are assigned color values derived from present color values in said raw image data; generating a sharpening term by processing raw image data from said raw color image; and combining said color image with said sharpening term so as to produce an improved color image.

In a preferred embodiment, said generating a color image and said generating a sharpening term are performed in parallel and independently of each other.

In this embodiment, said generating a color image results in a number of single-color images, wherein said combining involves adding said sharpening term to each of said single-color images.

Moreover, in this embodiment, said generating a color image involves interpolating said assigned color values from said present color values in said raw image data. These measures avoid the amplification of color interpolation artifacts, since both the color interpolation and the sharpening operate directly on raw and unprocessed image data. Further, using a single sharpening term for all colors is advantageous since it will require fewer operations and produce less colored noise.

Embodiments of the invention may be suitable for handling raw color images having a non-uniform distribution of color values for its pixels, such that color values belonging to a first color are more frequent than color values belonging to a second color. Typically, said first color is green and is represented on every row of pixels in said raw color image, in the format commonly known as Bayer image. Therefore, embodiments of the invention may allow use of a simple and inexpensive image sensor (e.g. Bayer sensor), while still producing a high-quality full color image as output.

Aforesaid generating a color image by interpolation may involve thresholding for reducing noise and pattern artifacts, wherein an input color value between a predetermined low threshold level and a predetermined high threshold level is output as zero, an input color value which is lower than said predetermined low threshold level is output as an output color value linearly dependent on said lower input color value, and an input color value which is higher than said pre-determined high threshold level is output as an output color value linearly dependent on said higher input color value. Applying thresholding in this way may serve to eliminate or at least reduce any of the afore-mentioned spurious differences between different types of color values, such as G1 and G2 in a Bayer image. Moreover, the thresholding may conveniently be tuned to a particular type of image sensor which is used in an actual implementation.

Alternatively or in addition, aforesaid generating a color image by interpolation may involve a median calculation comprising: selecting a pixel set including pixels spatially close to a center pixel in said raw color image; determining a set of differences, wherein each of the elements in said set of differences corresponds to a difference in color value between two adjacent pixels in said pixel set; sorting said set of differences in descending or increasing order; determining an average value for the middlemost values in said sorted set of differences; and adding said average value to the color value of said center pixel. An effect of applying median calculation in this way may be to avoid blurry color edges. Furthermore, this solution may increase the resolution of certain details in the image.

Said pixel set may be a part of a row or column of pixels in said raw color image.

Alternatively or in addition, aforesaid generating a color image by interpolation comprises an orientation determination, in which a vertical, horizontal, right diagonal or left diagonal orientation of said raw color image is determined in order to adjust said interpolation according to said orientation.

Said generating a color image, said generating a sharpening term and said combining are performed on successive sub-windows of said raw color image.

A second aspect of the invention is an image processing device comprising: a receiving module adapted to receive a raw color image as produced by an image sensor; an interpolation module adapted to generate a color image having a plurality of pixels by processing raw image data from said raw color image, wherein pixels for which color values are absent in said raw image data are assigned color values derived from present color values in said raw image data; a sharpening module adapted to generate a sharpening term by processing raw image data from said raw color image; and a combining module adapted to combine said color image with said sharpening term so as to produce an improved color image. Such an image processing device may be particularly suitable for realization in hardware, thereby in turn offering fast processing speed and low system cost.

A third aspect of the invention is an integrated circuit comprising an image processing device according to the second aspect. An integrated circuit may conveniently be connected to an image sensor and/or be included in an image capturing device.

A fourth aspect of the invention is a computer program product directly loadable into a memory of a processor, the computer program product comprising program code for performing the method according to the first aspect.

A fifth aspect of the invention is an image capturing device comprising an image sensor and at least one of an image processing device according to the second aspect, an integrated circuit according to the third aspect or a computer program product according to the fourth aspect.

The second to fifth aspects of the invention generally have the same objectives, features and advantages as the first aspect.

A sixth aspect of the invention is an image down-scaling method for an image being processed row by row, the method comprising: downscaling said image horizontally, according to a predetermined horizontal size, into a horizontally downscaled image; and downscaling said horizontally downscaled image vertically, according to a predetermined vertical size, into a horizontally and vertically downscaled image. Performing the horizontal downscaling first will have the effect that less image data has to be kept in memory.

Said horizontal downscaling may comprise an oversampling for downscaling in powers of 2 and a linear interpolation for downscaling in smaller fractions. Correspondingly, said vertical downscaling may comprise an oversampling for downscaling in powers of 2 and a linear interpolation for downscaling in smaller fractions. Downscaling in powers of 2 allows efficient implementation involving simple bit shifts.

In one embodiment, said horizontal downscaling is performed on single rows of image data from said image, whereas said vertical downscaling is performed on groups of adjacent rows of image data from said image.

An image downscaling device may comprise means for performing aforesaid downscaling and may be realized as an integrated circuit. An image capturing device, which comprises an image sensor, may further comprise such an image downscaling device or integrated circuit.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objectives, features and advantages of the present invention, will be better understood through the following illustrative and non-limiting detailed description of embodiments of the present invention, with reference to the appended drawings, where the same reference numerals will be used for similar elements, wherein.

DETAILED DESCRIPTION OF EMBODIMENTS

Figure 1:
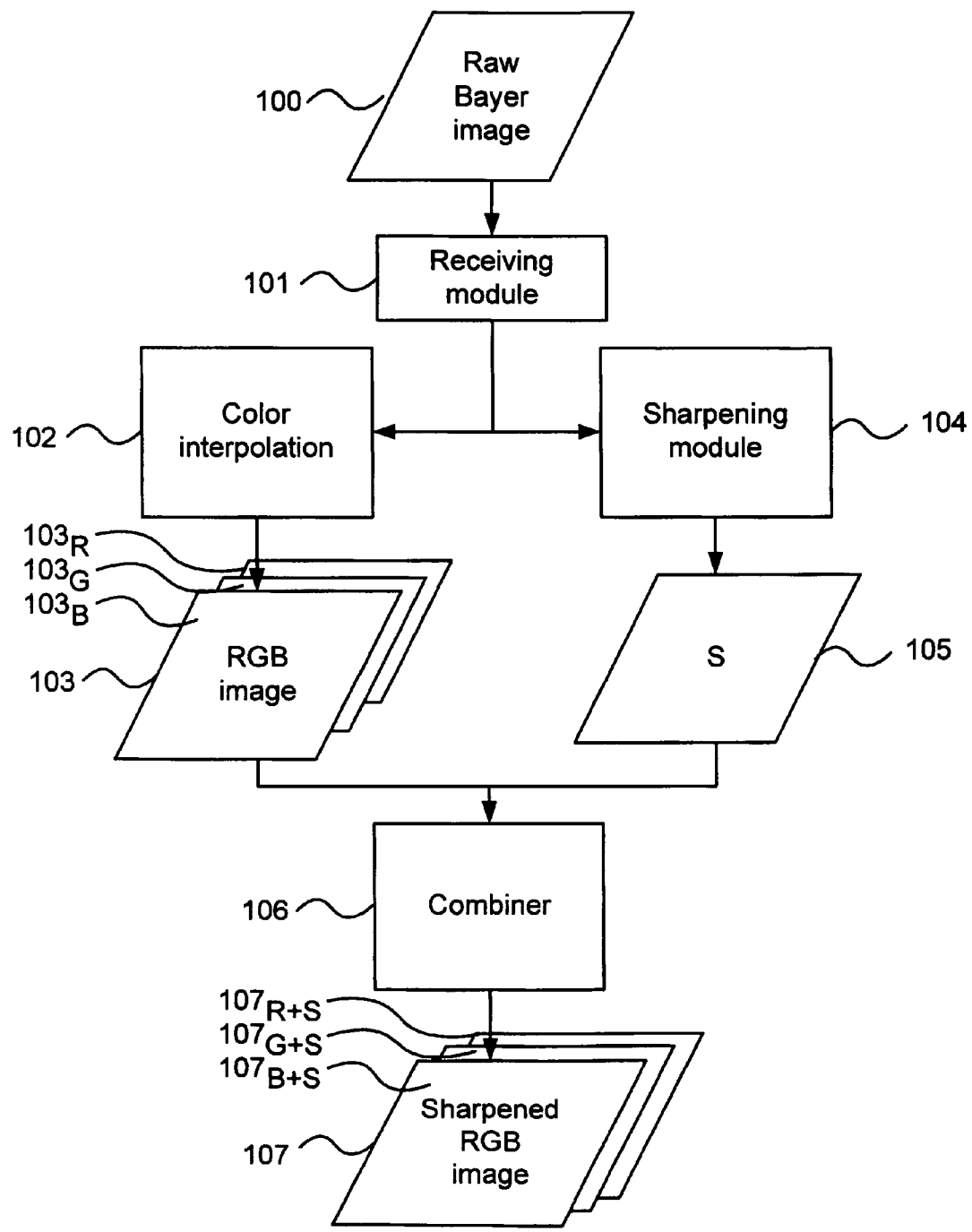
FIG. 1 is a flow chart to give a high-level overview of one embodiment of the present invention.

FIG. 1 gives a general overview of one embodiment of the present invention for converting a Bayer image 100 into an RGB image. A raw Bayer image 100 is received by a receiving module 101. A sub-window of the raw Bayer image 100 is thereafter transferred separately into a color interpolation module 102 and into a sharpening module 104. The color interpolation module 102 determines and outputs an RGB image 103, wherein each pixel contains color values for red, green and blue. More specifically, the RGB image 103 is represented as three single-color images $103_R$, $103_G$ and $103_B$, where the red image $103_R$ comprises the red value for each pixel, the green image $103_G$ comprises the green value for each pixel and the blue image $103_G$ comprises the blue value for each pixel.

The sharpening module 104 determines a sharpening term 105, denoted S, on the basis of the sub-window of the raw Bayer image 100.

Next, the sharpening term 105, S, is added to each of the three different single-color images, $103_R$, $103_G$ and $103_B$, of the RGB image 103 in a combiner 106. Hence, a sharpened RGB image 107 is achieved comprising three single-color images, $107_{R+S}$, $107_{G+S}$ and $107_{B+S}$.

After each single pixel value has been produced by the color interpolation and sharpening modules, the sub-window is moved one step forward in the Bayer image 100 and the process is repeated for a new sub-window.

As will be seen below, an RGB image does not necessarily have to comprise three parallel streams of color values, e.g. on a hardware level the RGB image may be represented as a single interleaved pixel stream, wherein the different color channels are represented in a pre-determined order. However, the above overview applies regardless of the representation of the RGB image.

To sum up, unprocessed raw image data is input separately into the color interpolation module 102 and the sharpening module 104, and after being processed independently in these two modules the output from these two modules are combined into a sharpened RGB image 107. Since both modules receive unprocessed raw image data, no falsely interpolated image data from the color interpolation module 102 is enhanced in the sharpening module 104, or, vice versa.

In the following, a detailed description is given of methods and hardware that implement the above general principles, according to a particular embodiment which is based on each sub-window including 5×5 adjacent pixels or sites. In other embodiments, the sub-window size may be different. Preferably, by not necessarily, each sub-window includes an odd number of columns and rows of pixels, such as 3×3, 5×5, 7×7, 5×3, 7×3, 7×5, 3×5, 3×7, 5×7, etc.

Color Interpolation Module

Figure 2:
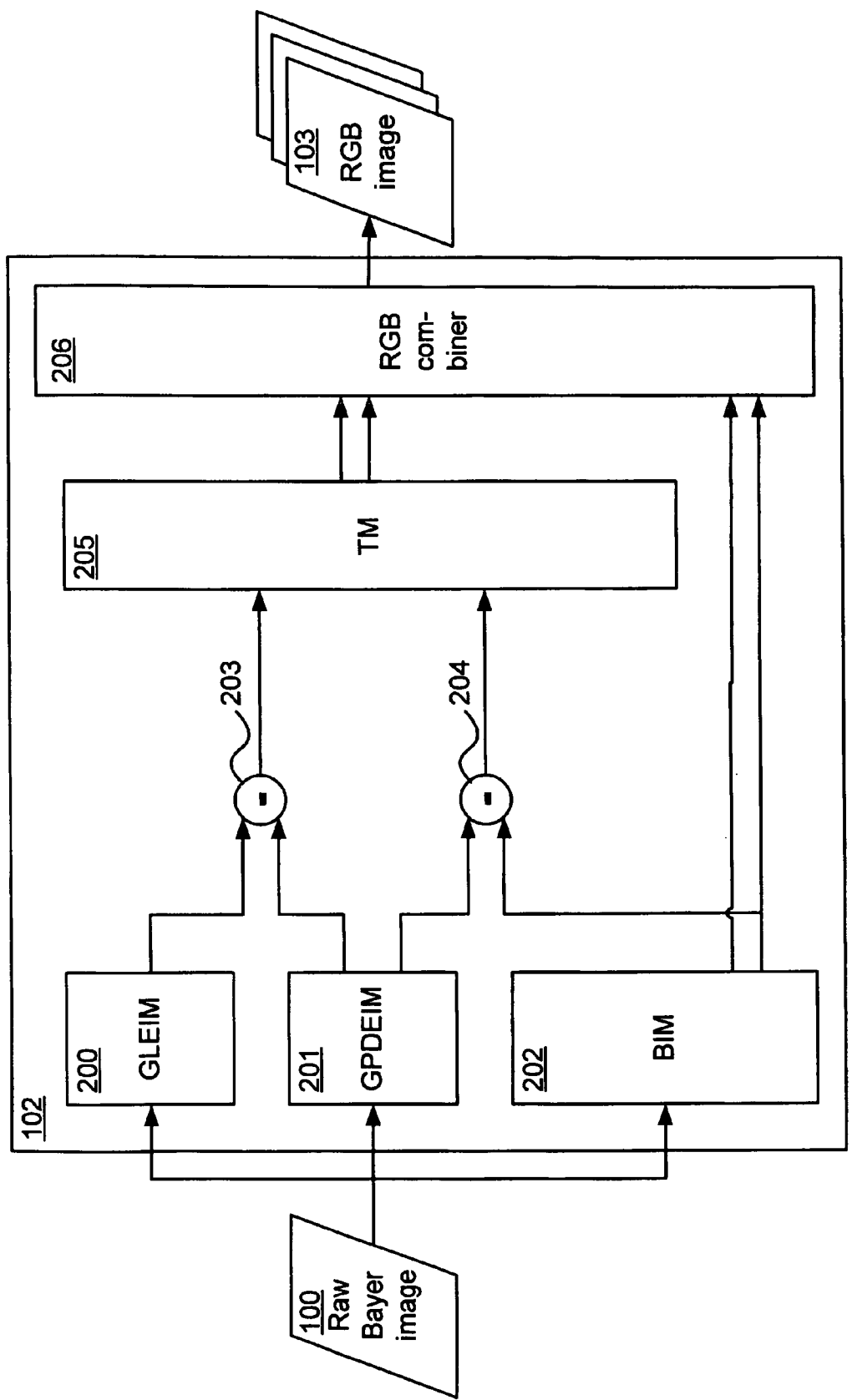
FIG. 2 is a flow chart of a color interpolation module.

Referring now to FIG. 2, the color interpolation module 102 is further described. The 5×5 sub-window of the raw Bayer image 100 is input separately into three different modules; a Green channel low-pass edge-sensing interpolation module (GLEIM) 200, a Green channel pixel difference edge-sensing interpolation module (GPDEIM) 201 and a Basic Interpolation Module (BIM) 202.

The reason why green pixels are interpolated in the GLEIM 200 and the GPDEIM 201 is because green pixels are twice as frequent as the red pixels or the blue pixels, i.e. more information is available about the green channel of the image than about the red and the blue channels, respectively.

Figure 3:
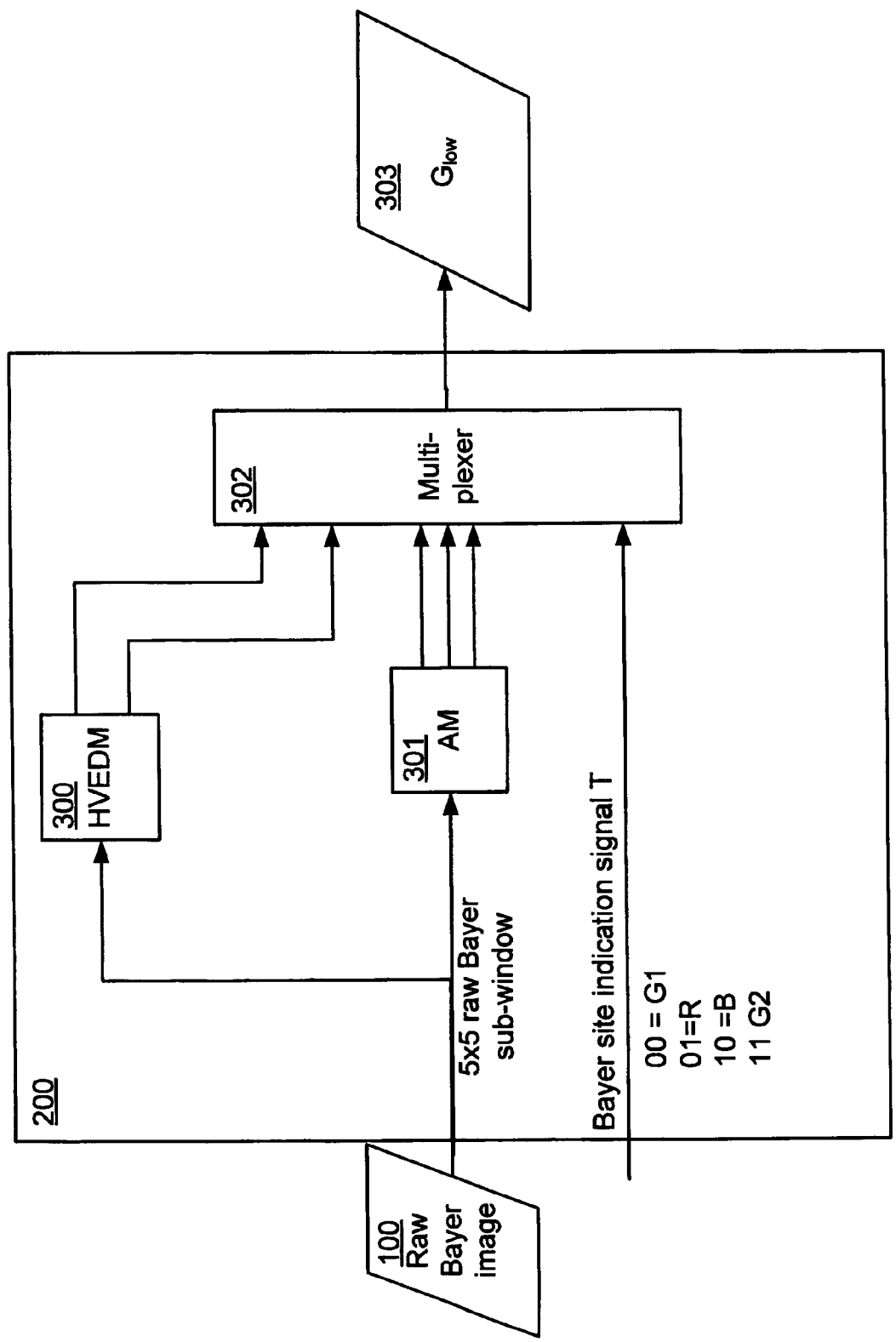
FIG. 3 is a flow chart of a green channel low-pass edge-sensing interpolation module.
Figure 4:
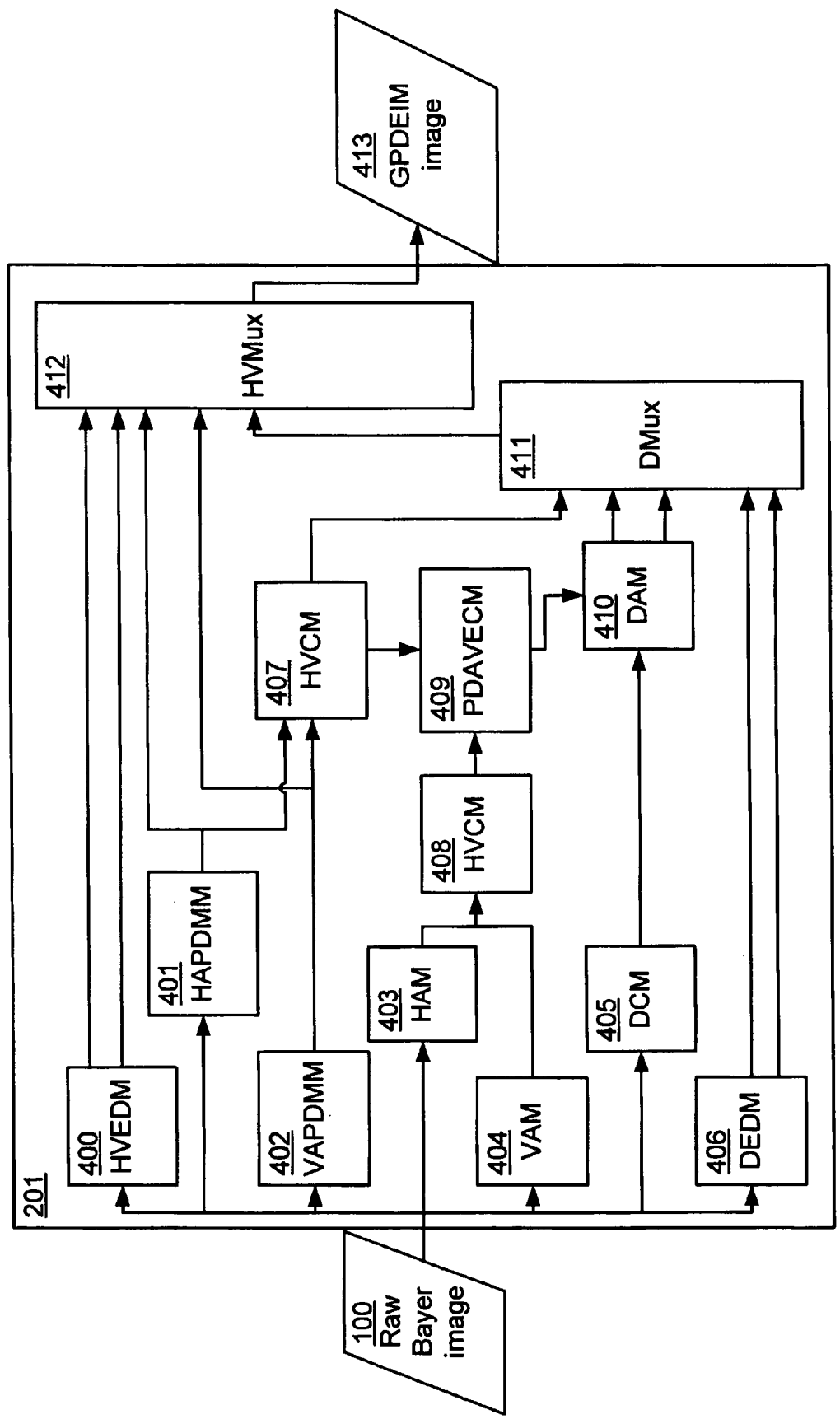
FIG. 4 is a flow chart of a green channel pixel difference edge-sensing interpolation module.

From the GLEIM 200 a $G_{low}$ image 303 is output, as seen in FIG. 3, and from the GPDEIM 201 a GPDEIM image 413 is output, as seen in FIG. 4.

In the Basic Interpolation module (BIM) 202 a red and blue base (RBbase) image and a green base (Gbase) image are determined on the basis of the 5×5 sub-window of the raw Bayer image 100.

The $G_{low}$ image and the GPDEIM image are input into a subtracter 203, in which the GPDEIM image is subtracted by the $G_{low}$ image. This subtraction extracts high-frequency content from the green channel that is used to enhance the red and blue channels, and therefore the output from the subtracter 203 is denoted red and blue highlight (RBhighlight) term. The $G_{low}$ image is a low-detail image that results from smoothing of edges that are detectable from the green channel data. In other words, the $G_{low}$ image is calculated from green channel data in such a way as to mimic the RBbase image. The GPDEIM image, on the other hand, is a high-detail image also calculated from green channel data. The difference between the $G_{low}$ and GPDEIM images thus contains information about how the interpolated sites of the RBbase image may be amended to better reflect the structures present in the green channel data.

Similarly, the GPDEIM image and the Gbase image are input into a subtracter 204. In this subtracter the GPDEIM image is subtracted by the Gbase image. Similar to RBhighlight, this subtraction also extracts high-frequency content from the green channel, but it is instead used for producing the green output channel, and therefore the output from the subtracter 204 is denoted green highlight (Ghighlight) term.

Figure 6:
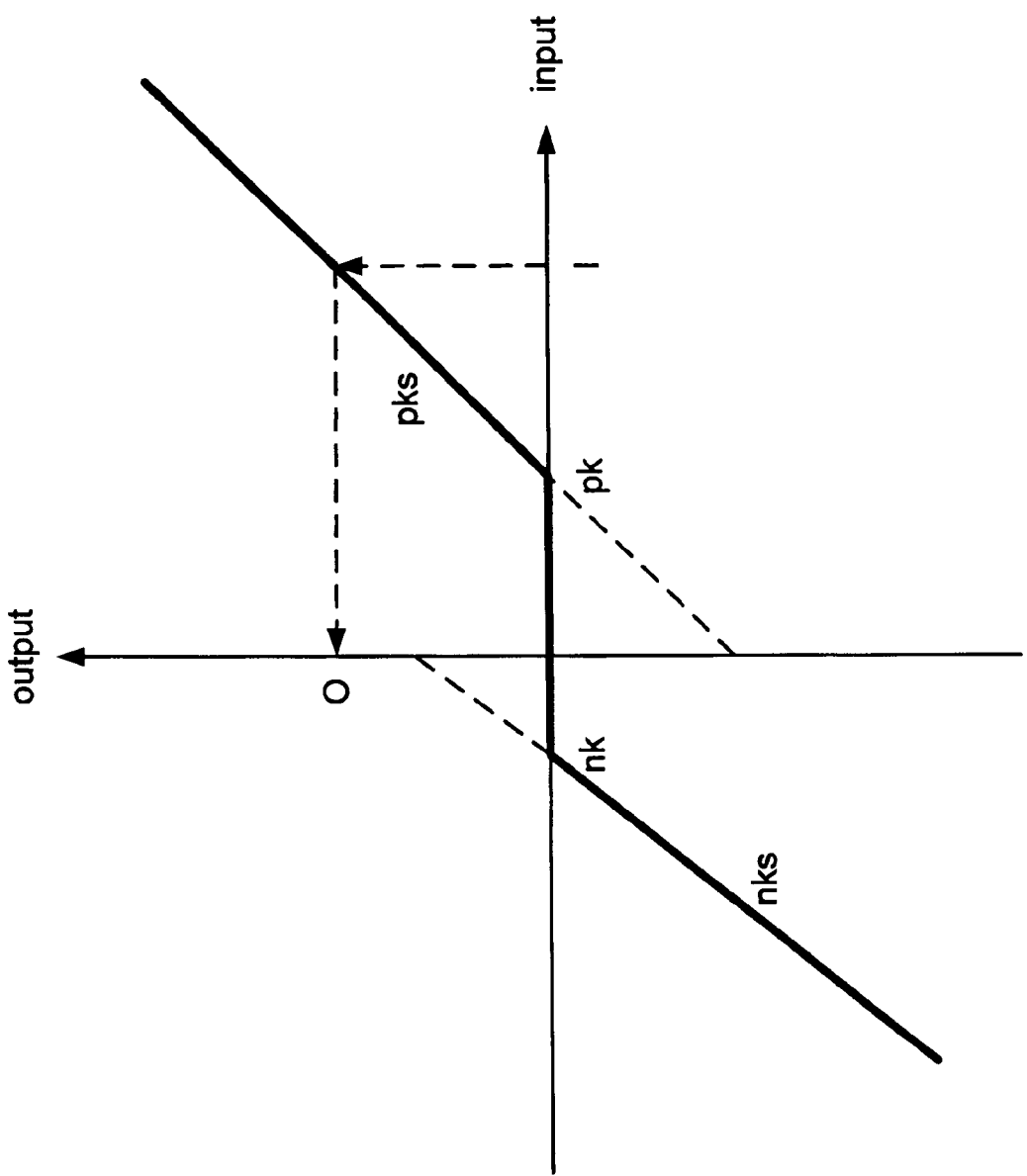
FIG. 6 schematically illustrates the function of a threshold module.

Next, the RBhighlight term and the Ghighlight term are input into a Threshold Module (TM) 205, in which the RBhighlight values and the Ghighlight values are thresholded according to the thresholding method described in FIG. 6. The two output streams from the TM 205 are called RBhighlightT term and GhighlightT term. As will be further described below, the TH 205 serves to eliminate or at least significantly reduce noise as well as artifacts caused by differences in G1 and G2 pixel response.

Finally, the two base images, RBbase and Gbase images, and the two thresholded highlight terms, RBhighlightT term and GhighlightT term, are input into an RGB combiner 206, in which the RBhighlightT term is added to the RBbase image and the GhighlightT term is added to the Gbase image.

The resulting three images are the three components of the RGB image 103.

In order to achieve a hardware-efficient solution, the red and blue values may be represented on the same signal. Hence, the RGB combiner needs two clock cycles in order to achieve both the red and blue component of the image.

In summary, the color interpolation module 102 is divided into three color interpolation sub-modules; the GLEIM 200, the GPDEIM 201 and the BIM 202. The GLEIM 200 and the GPDEIM 201 process the raw Bayer image 100 to interpolate the green channel, i.e. G1 and G2, while the BIM interpolates all three color channels. Hence, the fact that green pixels are more frequent than red or blue pixels is taken into account efficiently.

A specific embodiment of the color interpolation module and its sub-modules will now be presented in detail. This embodiment has, i.a., been designed to have a low sensitivity to differences in G1 and G2 pixel response, while still providing an RGB image with high sharpness and low appearance of color fringes. The embodiment has also been designed to generally reduce the presence of artifacts in the resulting RGB image.

Green Channel Low-Pass Edge-Sensing Interpolation Module (GLEIM)

Now, referring to FIG. 3, the GLEIM 200 is presented in greater detail. This module produces a low-pass filtered green channel image, a useful step in eliminating color-fringe artifacts.

Due to the structure of the Bayer image, the color of the center pixel of the 5×5 sub-window varies. Therefore, a system of reference, which does not depend on colors, is suitable. The system of reference, described below, is used:

$$\begin{pmatrix} \cdots & \cdots & EU & \cdots & \cdots \\ \cdots & CLU & VU & CRU & \cdots \\ EL & HL & E & HR & ER \\ \cdots & CLD & VD & CRD & \cdots \\ \cdots & \cdots & ED & \cdots & \cdots \end{pmatrix}$$

where E is the center pixel, HL is the horizontal neighbor to the left, HR is the horizontal neighbor to the right, VU is the vertical upper neighbor, VD is the vertical lower neighbor, CLU is the pixel above the HL, CLD is the pixel below the HL, CRU is the pixel above the HR, CRD is the pixel below the HR, EU is the pixel above the VU, ED is the pixel below the VD, EL is the horizontal neighbor to the left of the HL, and ER is the horizontal neighbor to the right of the HR.

First, the 5×5 sub-window is transferred into an Average Module (AM) 301. In this module a horizontal average value, $H_{avg}$, a vertical average value, $V_{avg}$, and a corner pixel average value, $C_{avg}$, are determined:

$H_{avg}=(HL+HR)/2$ $V_{avg}=(VU+VD)/2$ $C_{avg}=(CLD+CLU+CRD+CRU)/4$

Note that by determining average values instead of median values the possible difference between G1 and G2 pixel values is not taken into consideration. Hence, the output value of this module may comprise noise relating to the difference between G1 and G2 pixels.

The 5×5 sub-window is also input into a Horizontal/Vertical Edge Detection module (HVEDM) 300. The HVEDM 300 investigates the 5×5 sub-window of the raw Bayer image 100 in order to find horizontal or vertical edges, i.e. drastical value changes between adjacent pixels. The output from the HVEDM 300 is two Boolean values, denoted Horizontal Edge Detected (HED) and Vertical Edge Detected (VED). There are three possible alternatives; a dominant horizontal structure is detected (HED=1, VED=0), a dominant vertical structure is detected (HED=0, VED=1), or neither a dominant horizontal structure nor a dominant vertical structure is detected (HED=0, VED=0).

In order to detect horizontal structure in the raw Bayer image a convolution between the raw Bayer image, RBI, and a convolution kernel for horizontal edge detection is determined. Thereafter, a convolution is determined between the absolute value of the result of this convolution and a weighting matrix:

$$K_X = \left| RBI \cdot \begin{pmatrix} -1 & -2 & -1 \\ 0 & 0 & 0 \\ 1 & 2 & 1 \end{pmatrix} \right| \cdot \begin{pmatrix} 1 \\ 2 \\ 1 \end{pmatrix}$$

where $K_X$ is a matrix containing the result of the two convolutions.

Next, a corresponding matrix regarding the vertical edge detection, $K_Y$, is determined:

$$K_Y = \left| RBI \cdot \begin{pmatrix} -1 & 0 & 1 \\ -2 & 0 & 2 \\ -1 & 0 & 1 \end{pmatrix} \right| \cdot (1 \quad 2 \quad 1)$$

For each Bayer 5×5 sub-window, the HVEDM determines a pair of local detection values $k_x$ and $k_y$ that are the elements of the $K_x$ and $K_y$ detection matrices corresponding to the central pixel (E) of the 5×5 Bayer sub-window.

To reduce maze artifacts it is important to avoid spurious edge detections. Therefore, in this embodiment, in order to signify a horizontal edge the amount of vertical high-frequency content must be at least twice as large as the horizontal high-frequency content, and vice versa for finding a vertical edge.

Thus, if the local horizontal edge detection measure, $k_X$, is significantly higher, in this embodiment twice as high, than the local vertical edge detection measure, $k_Y$, the Boolean value HED is set to 1, and vice versa for the vertical case, i.e. VED. Thus:

$HED = k_X > 2k_Y$ $VED = k_Y > 2k_X$

The above-described edge detection algorithm has been designed to be robust while still yielding relatively precise orientation information (HED/VED) to be used in subsequent processing for outputting interpolated data ($G_{low}$). The robustness and precision contribute to reducing the amount of artifacts in the resulting RGB image.

The output values from the AM 301 and the HED and VED values are fed into a multiplexer 302. This unit also uses an input signal T specifying the type of pixel currently residing in the center pixel of the Bayer sub-window.

The output of the multiplexer 302 is a Green channel low-pass value 303, $G_{low}$. If the signal T states that the E pixel has a green color, either G1 or G2, the $G_{low}$ value is determined as:

$G_{low} = C_{avg}$

However, if the E pixel is red (R) or blue (B), the HED and VED values are taken into account, thus:

$G_{low} = V_{avg}$      if $HED = 1$ $G_{low} = H_{avg}$      if $VED = 1$ $G_{low} = (H_{avg} + V_{avg})/2$      otherwise This means that the direction of interpolation is selected so as to obtain a reduced sharpness, by the interpolation being effected orthogonal to the main edge direction (given by HED/VED) in the sub-window. Thus, GLEIM 200 produces a low-pass filtered green image, $G_{low}$, with certain sensitivity to differences in response between G1 and G2 pixels.

In summary, the GLEIM 200 determines the orientation of the image in the HVEDM 300 and calculates a number of average values in the AM 301. Depending on the color of the center pixel, E, and the orientation of the image, a low-pass filtered green image, $G_{low}$, is output. By taking the orientation of the image into account a desired low-pass interpolation may be achieved.

Green Channel Pixel Difference Edge-Sensing Interpolation Module (GPDEIM)

Now, referring to FIG. 4, the Green channel pixel difference edge-sensing interpolation module (GPDEIM) 201 is further described. This module performs an interpolation of green channel data to achieve a high level of detail, optimized to prevent blurring.

The 5×5 sub-window of the raw Bayer image 100 is input separately into seven different modules.

The first module is a Horizontal/Vertical Edge Detection Module (HVEDM) 400, similar to the HVEDM 300 in the GLEIM 200, outputting a HED Boolean value and a VED Boolean value. In fact, the present embodiment uses a single HVEDM instance, shared between GPDEIM and GLEIM, while they are represented as separate instances in the figures for simplicity.

The second module is a Horizontal Adjacent Pixel Difference Median Module (HAPDMM) 401 outputting a HAPDMM value, $H_a$, determined as:

$H_a = E + \text{median}(HL-EL, HL-E, HR-E, HR-ER)$ where $H_a$ is a value based on horizontally adjacent pixels, and the other variables are in accordance with the previously described system of reference.

The median value is determined by first sorting the differences in descending order, and thereafter determining the average value of the two middlemost differences.

The third module is a Vertical Adjacent Pixel Difference Median Module (VADPMM) 402 outputting a VAPDMM value, $V_a$, determined as:

$V_a = E + \text{median}(VU-EU, VU-E, VD-E, VD-ED)$ where $V_a$ is a value based on vertically adjacent pixels, and the other variables are in accordance with the previously described system of reference. The median value is also determined in accordance with the previous description.

Thus, both HAPDMM 401 and VAPDMM 402 implement a one-dimensional interpolation (along a row and a column, respectively). As will be seen in the following, the output from these modules may thus be used to interpolate green pixel values along a detected orientation. It should be noted that these modules also yield sharpness to details that deviate from this orientation, since their output is a direct function of the variable E.

Fourthly, a Horizontal Average Module (HAM) 403 receives the raw Bayer image 100 as input. In this module a Horizontal average value ($H_{AVE}$) is determined based on the Horizontal Left neighbor (HL) and the Horizontal Right neighbor (HR), thus:

$$H_{AVE} = \frac{1}{2}(HL + HR)$$

Fifthly, the 5×5 sub-window is received as input by a Vertical Average Module (VAM) 404. In this module a Vertical average value ($V_{AVE}$) is determined based on the Vertical Upper neighbor (VU) and Vertical Lower neighbor (VD):

$$V_{AVE} = \frac{1}{2}(VU + VD)$$

Sixthly, the 5×5 sub-window is received as input by a Diagonal Correction Module (DCM) 405. In this module, a Diagonal Enhancement Term (DET) is calculated according to:

$$DET = \frac{1}{2}(CLU + CRD - CLD - CRU)$$

Seventhly, the 5×5 sub-window is received as input by a Diagonal Edge Detection Module (DEDM). The DEDM 406 investigates the 5×5 sub-window of the raw Bayer image 100 in order to find diagonal edges, either directed from the lower left corner to the upper right corner of the raw Bayer image 100, hereafter referred to as Left-Diagonal (LD) structure, or directed from the upper left corner to the lower right corner of the raw bayer image 100, hereafter referred to as Right-Diagonal (RD) structure. The output from the DEDM 406 is two Boolean values, denoted Left-Diagonal Edge Detected (LDED) and Right-Diagonal Edge Detected (RDED). There are three possible alternatives; a dominant LD structure is detected (LDED=1, RDED=0), a dominant RD structure is detected (LDED=0, RDED=1), or neither a dominant LD structure nor a dominant RD structure is detected (LDED=0, RDED=0).

In order to detect a Right-Diagonal (RD) structure, a method similar to the above mentioned method for finding horizontal and vertical edges is used. Firstly, a convolution between the 5×5 sub-window of the raw Bayer image and a first convolution kernel for RD edge detection is determined. Secondly, a convolution between the raw Bayer image and a second convolution kernel for RD edge detection is determined. Thereafter, the absolute values of the two resulting matrices are added to form $K_{RD}$, thus:

$$K_{RD} = \left| RBI \cdot \begin{pmatrix} 0 & 1 & 0 \\ -1 & 0 & 0 \\ 0 & 0 & 0 \end{pmatrix} \right| + \left| RBI \cdot \begin{pmatrix} 0 & 0 & 0 \\ 0 & 0 & -1 \\ 0 & 1 & 0 \end{pmatrix} \right|$$

For each 5×5 Bayer sub-window, the DEDM calculates a local right diagonal edge-detection measure, $k_{RD}$, according to:

$k_{RD} = |VU-HL| + |VD-HR|$

This is equivalent to the central element of the $K_{RD}$ matrix above.

The DEDM also calculates $k_{LD}$, the left-diagonal counterpart of $k_{RD}$, according to:

$k_{LD} = |VU-HR| + |VD-HL|$

Thereafter, if the RD edge detection measure, $k_{RD}$, is significantly higher, in this embodiment twice as high, than the LD edge detection measure, $k_{LD}$, the Boolean value RDED is set to 1, and vice versa for the vertical case and LDED. Thus:

$$RDED=k_{RD}>2k_{LD}$$

$$LDED=k_{LD}>2k_{RD}$$

The output from the HAPDMM 401 and the VAPDMM 402 are input into a Horizontal/Vertical Combination Module (HVCM) 407, in which a Combined Horizontal/Vertical value ($CHV_{PD}$) regarding pixel differences is determined on the basis of the $H_a$ determined in the HAPDMM 401 and the $V_a$ determined in the VADPMM 402. Thus:

$$CHV_{PD} = \frac{1}{2}(H_a + V_a)$$

The output from the HAM 403 and the output from the VAM 404 are input into a Horizontal/Vertical Combination Module (HVCM) 408, in which a Combined Horizontal/Vertical Average Value ($CHV_{AVE}$) is determined on the basis of the Horizontal Average value ($H_{AVE}$) determined in the HAM 403, and the Vertical average value ($V_{AVE}$) determined in the VAM 404:

$$CHV_{AVE} = \frac{1}{2}(H_{AVE} + V_{AVE})$$

After that, the output from the HVCM 407 and the output from the HVCM 408 are input into a Pixel Difference/Average Combination Module (PDAVECM) 409, in which a Combined Pixel Difference and Average Value (CPDAVE) is determined on the basis of the Horizontal Pixel Difference value ($H_a$), the Vertical Pixel Difference value ($V_a$), the Horizontal Average Value ($H_{AVE}$) and the Vertical Average Value ($V_{AVE}$). Thus:

$$CPDAVE = \frac{1}{4}(H_a + V_a + H_{AVE} + V_{AVE})$$

The output image from the PDAVECM 409 and the Diagonal Enhancement Term (DET) from the DCM 405 are input into a Diagonal Amplifying Module (DAM) 410. In this module two diagonally amplified matrices are determined, one Right-Diagonal Amplified (RDA) matrix and one Left-Diagonal Amplified (LDA) matrix:

$$RDA=CPDAVE+DET \quad (1)$$

$$LDA=CPDAVE-DET \quad (2)$$

In the RDA case the DET is added, however, in the LDA case the DET is subtracted.

Due to the fact that the right-diagonal amplifying elements in the convolution kernel in DCM 405 are positive and the left-diagonal amplifying elements in the convolution kernel in DCM 405 are negative, right-diagonal image structure is enhanced by adding DET, while left-diagonal image structure is enhanced by subtracting DET.

A diagonal multiplexer DMux 411 is used to forward the appropriately interpolated green value in consideration of the diagonal edge-detection results. The two enhanced images LDA and RDA, determined in the DAM 410, the output from the HVCM 407, called an HVCM image, and the LDED and RDED Boolean values, determined in the DEDM 406, are all taken as input in this multiplexer. Depending on the diagonal structure, i.e. the Boolean values LDED and RDED, one of the input values is chosen as output as follows:

| LDED | RDED | DMux output |
|---|---|---|
| 1 | 0 | LDA image |
| 0 | 1 | RDA image |
| 0 | 0 | HVCM image |

Thus, in this embodiment, the GPDEIM 201 is configured to detect diagonal structures in the input image and, if present, enhance the dominant structure with the Diagonal Enhancement Term (DET), which is calculated from the input image.

Finally, a horizontal/vertical multiplexer (HVMux) 412 is used to forward the most accurately interpolated green value with respect to the horizontal and vertical edge detection outcome. The Boolean values HED and VED from the HVEDM 400 are input into this multiplexer, as well as the output from the HAPDMM 401, called a HAPDMM value, the output from the VAPDMM 402, called a VAPDMM value, and the output from the DMux 411, called a DMux value.

Depending on the Boolean values, HED and VED, one of the values, HAPDMM value, VAPDMM value or DMux value, is chosen as output from the HVMux 412, i.e. the GPDEIM image output:

| VED | HED | GPDEIM output |
|---|---|---|
| 1 | 0 | VAPDMM value |
| 0 | 1 | HAPDMM value |
| 0 | 0 | DMux value |

To sum up, the GPDEIM 201 comprises modules for detecting the orientation of the image, which orientation may be horizontal, vertical, right-diagonal or left-diagonal. Depending on this determined orientation, an appropriate output may be chosen. The GPDEIM 201 further comprises modules for determining the differences between pixel values in a row or a column. These modules make it possible to take details which do not correspond to the orientation of the image into account. Thus, the GPDEIM output is an image with a high degree of sharpness, but with certain sensitivity to differences in G1 and G2 pixel response.

Basic Interpolation Module (BIM)

Figure 5:
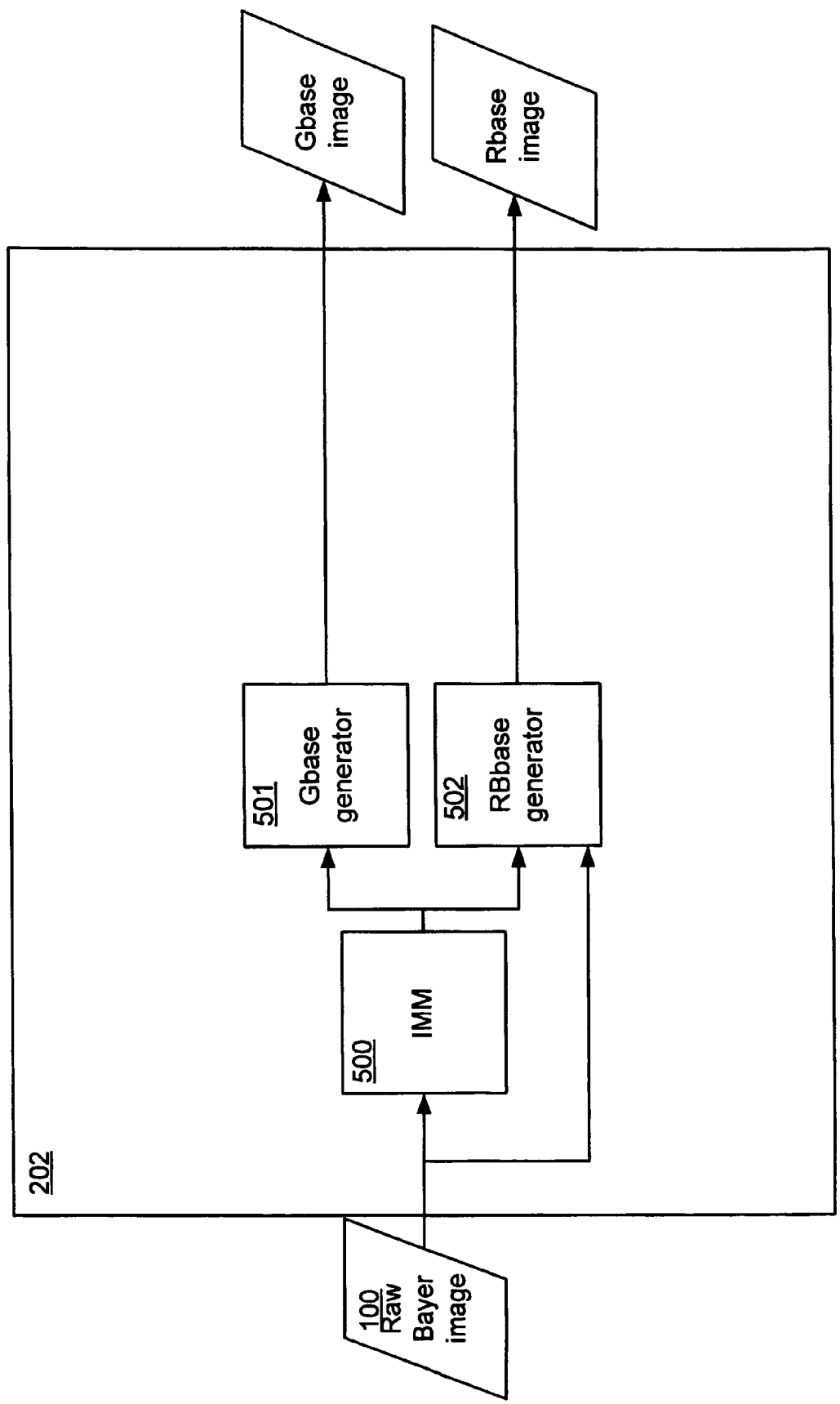
FIG. 5 is a flow chart of a basic interpolation module.

Now, referring to FIG. 5, the Basic Interpolation Module (BIM) 202 is further described. The purpose of this module is to produce an RGB image that is completely free of pattern artifacts, particularly the maze artifacts often produced due to difference in G1 and G2 pixel response. The 5×5 sub-window of the raw Bayer image 100 is input to an Interpolation and Median Module (IMM) 500.

Firstly, a horizontal average value, a vertical average value and a median value are determined as:

$$H_{avg}=(HL+HR)/2$$

$$V_{avg}=(VU+VD)/2$$

$$C_{median}=\mathrm{median}(CLU,CRU,CRD,CLD)$$

where $H_{avg}$ is a horizontal average value, $V_{avg}$ is a vertical average value, and $C_{median}$ is a median value for the C pixels according to the previous description. The median value is determined in accordance with the previous description.

Secondly, the $H_{avg}$, the $V_{avg}$ and the $C_{median}$ are transferred into a Gbase generator 501 and an RBbase generator 502, respectively.

In the Gbase generator 501 the Gbase image is produced. Depending on the type of Bayer pixel (G1, R, B, G2) that resides in the E position of the 5×5 sub-window, Gbase is calculated according to:

$G\text{base}=(E+C_{median})/2$ if E==G1 or E==G2

$G\text{base}=(H_{avg}+V_{avg})/2$ if E==R or E==B

It should be noted that the Gbase generator 501 is configured to calculate Gbase so that it contains the same amount of information from G1 and G2 pixels. Thereby, Gbase is independent of any deviation in response between G1 and G2 pixels.

The RBbase generator 502 is a multiplexer that produces the RBbase image, consisting of both red and blue values for every pixel. A single multiplexed output signal is used for both red and blue values.

Depending on both the Bayer site of the E pixel and the color channel to be output (red or blue), the multiplexer outputs different values from the IMM and the 5×5 sub-window as follows:

| Output color | Color of E | RBbase multiplexer output |
|---|---|---|
| R | G1 | $H_{avg}$ |
| R | R | E |
| R | B | $C_{median}$ |
| R | G2 | $V_{avg}$ |
| B | G1 | $V_{avg}$ |
| B | R | $C_{median}$ |
| B | B | E |
| B | G2 | $H_{avg}$ |

Finally, the Gbase and RBbase images are output from the BIM 202.

In summary, the BIM 202 determines a number of average values and median values for the present center pixel, wherein the median calculations are used in order to reduce the risk of a diagonal zipper effect. Depending on the color of the center pixel and the output color, an appropriate average value, median value or combination of average values and median values is output.

Threshold Module (TM)

Figure 7:
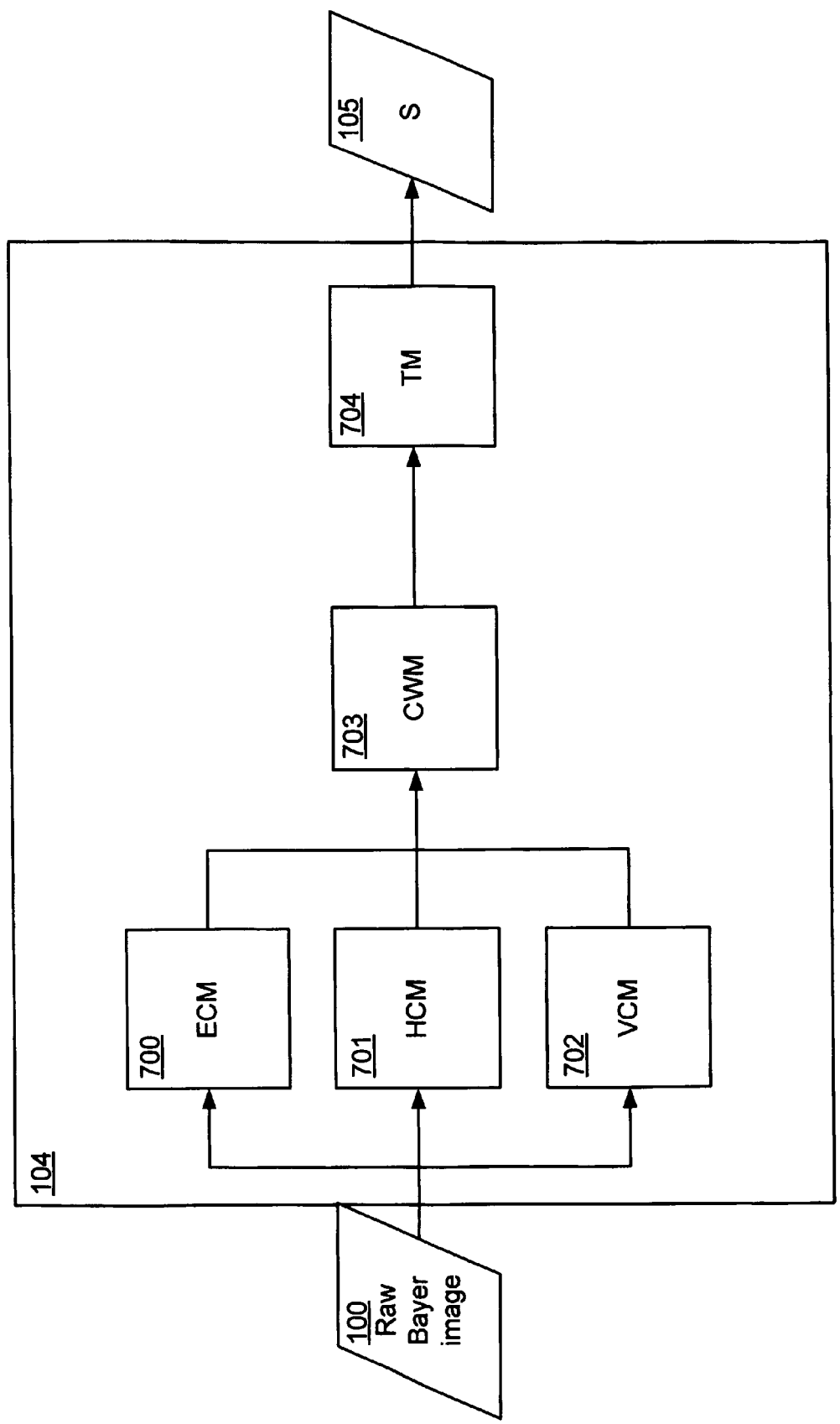
FIG. 7 is a flow chart of a sharpening module.

Referring to FIG. 6, the operating principle of a threshold module, similar to the one mentioned above and shown in FIG. 2 and to the one mentioned below and shown in FIG. 7, is further described. The same kind of module is used both for color interpolation and sharpening. The purpose of the threshold module is, in the color interpolation case, to eliminate or at least reduce pattern artifacts resulting from a difference in G1 and G2 pixel response, and, in the sharpening case, to reduce noise. The output O is determined on the basis of the input I according to the following:

$I<-nk \Rightarrow O=nks(I+nk)$ $-nk \leq I \leq pk \Rightarrow O=0$ $pk<I \Rightarrow O=pks(I-pk)$ where nk is the absolute value of the negative threshold level, pk is the absolute value of the positive threshold level, pks is the absolute value of the slope for positive input values and nks is the absolute value of the slope for negative input values.

The two threshold levels, nk and pk, may or may not have the same value, and the slope values, nks and pks, may or may not also have the same value.

The pk, nk, pks and nks values may be adjusted for each color in order to achieve an optimal color interpolation for a particular image sensor.

Briefly, small differences, e.g. between G1 and G2, are set to zero and larger differences are output as a value linearly dependent on the input value.

Sharpening Module

Referring to FIG. 7, the sharpening module 104 is further described. The purpose of the module is to extract the high-frequency component of the Bayer image, called a preliminary sharpening term, and to reduce the noise of that sharpening term. The 5×5 sub-window of the raw Bayer image 100 is input into the sharpening module 104, and a final monochromatic sharpening term, S, 105 is output from the sharpening module 104.

First, a high-pass filtering is performed as follows. The 5×5 sub-window of the raw Bayer image 100 is input into three different highlighting modules; E pixel convolution module (ECM) 700, H pixel convolution module (HCM) 701 and V pixel convolution module (VCM) 702.

The purpose of these modules 700-702 is to perform a high-pass filtering. The filter kernel used in this embodiment has been created to represent a convolution between a horizontal low-pass filtering matrix, a vertical low-pass filtering matrix and a high-pass filtering matrix, according to:

$$(1\ 2\ 1) \cdot \begin{pmatrix} 1 \\ 2 \\ 1 \end{pmatrix} \cdot \begin{pmatrix} -1 & -2 & -1 \\ -2 & 12 & -2 \\ -1 & -2 & -1 \end{pmatrix} = \begin{pmatrix} -1 & -4 & -6 & -4 & -1 \\ -4 & 0 & 8 & 0 & -4 \\ -6 & 8 & 28 & 8 & -6 \\ -4 & 0 & 8 & 0 & -4 \\ -1 & -4 & -6 & -4 & -1 \end{pmatrix}$$

In order to allow individual weighting of the color channels R, G1, G2 and B, the filtering operation is split into separate partial convolutions, where the ECM 700 performs a partial convolution involving only E type pixels, and the HCM 701 and VCM 702 involve only H and V type pixels, respectively. In this context, the E, H and V type pixels or Bayer sites of the 5×5 sub-window are given by the following notation:

$$\begin{pmatrix} E & H & E & H & E \\ V & C & V & C & V \\ E & H & E & H & E \\ V & C & V & C & V \\ E & H & E & H & E \end{pmatrix}$$

Each partial convolution represents a pixel-wise multiplication, in which each relevant pixel value (E, H, V) is multiplied by its corresponding value in the above filter kernel, followed by a summation of the resulting products. Thus, the three partial convolutions result in an E convolution value, an H convolution value, and a V convolution value.

Next, the convolution values from the ECM 700, HCM 701 and VCM 702 are fed into a Color Weighting Module (CWM) 703, in which each of the three convolution values are weighted separately by a weighting number $k_R$, $k_{G1}$, $k_{G2}$ or $k_B$, depending on the color (R, G1, G2 and B) currently residing in the E, H and V pixels. In this manner, only three multiplications are required for the color weighting rather than the 21 multiplications that would be needed if the weighting were to be performed before the convolution operation.

After multiplying the convolution values with their corresponding weighting numbers, the CWM 703 adds up the three contributions into a preliminary sharpening term.

Last, the output from the CWM 703 is input into a Threshold module (TM) 704 having a function as being described in FIG. 6. In the TM 704, the preliminary sharpening term is treated for noise reduction to produce the final sharpening term, S, 105.

Argus Video Pre-Processor (AVP)

Figure 8:
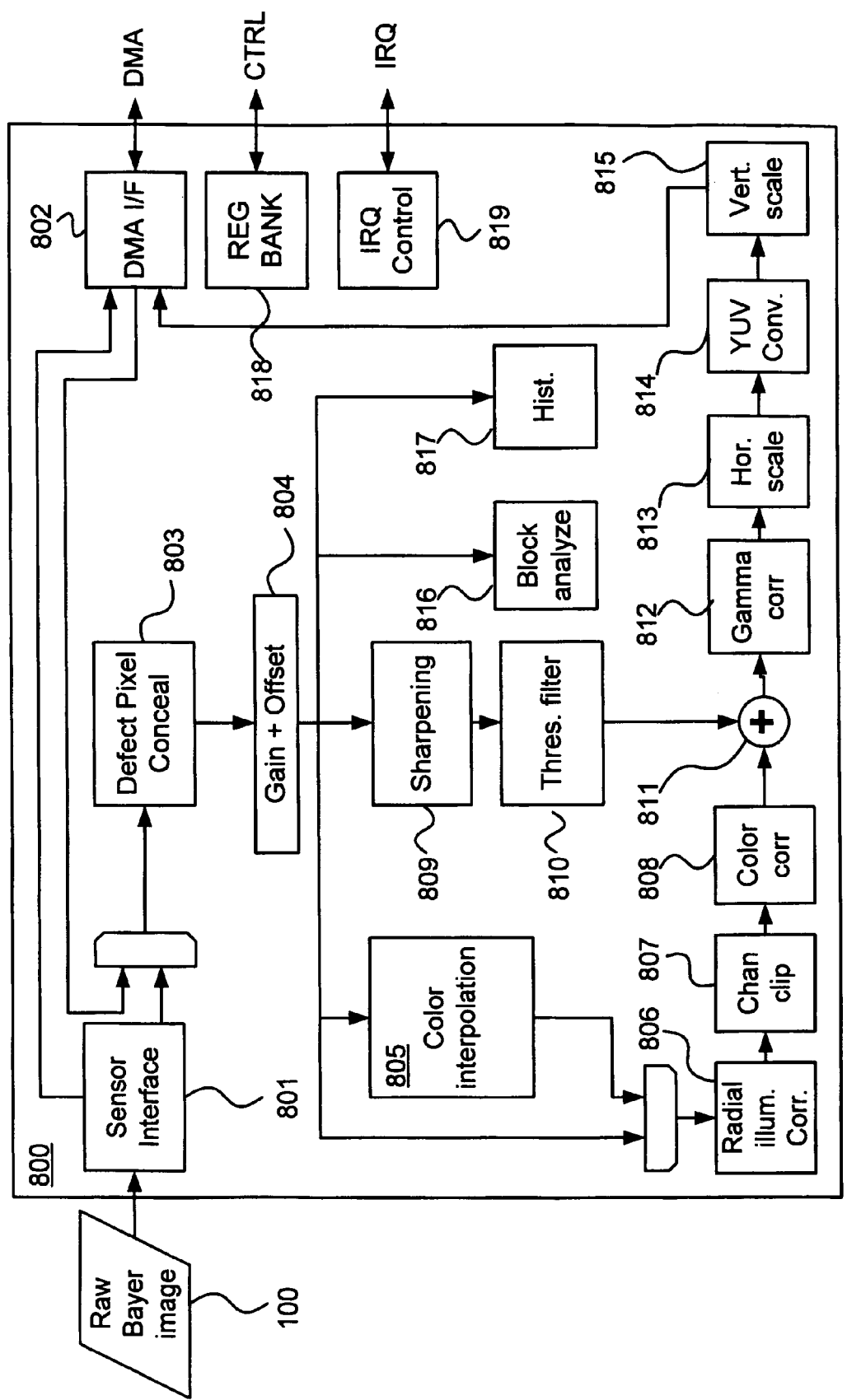
FIG. 8 schematically illustrates a video pre-processor in which the invention may be applied.

Now, referring to FIG. 8, an overview of a video pre-processor, more specifically called an Argus Video Pre-processor (AVP) 800, incorporating the modules above, is shown.

The raw Bayer image 100 from an image sensor is received by a sensor interface 801. Instead of a raw Bayer image the image data may be of YUV (Y—luminance, U—chroma channel U, blue component, V—chroma channel V, red component) type. Image data may also be received via a DMA (DMA—direct memory access) input channel 802.

Next, the image data reaches a defect pixel conceal module 803, wherein defect pixel locations and spurious pixels may be detected and concealed. This feature makes it possible to use an image sensor with some minor defects from the manufacturing process.

Thereafter, the image data enters a gain and offset module 804.

In a color interpolation module 805 the image data, comprising a raw Bayer image, is transferred into an RGB image with respect taken to the two different green values G1 and G2, according to the description above. If the image data is of YUV type, the color interpolation module is bypassed, and instead the Y values are passed on as green channel data for subsequent processing steps, while U and V values are horizontally up-sampled by a factor 2 and passed on as red and blue channel data, respectively.

The RGB image from the color interpolation module 805, or from aforesaid processing of YUV image data, is sent into a radial illumination correction module 806. In this module the incoming image data may be multiplied by a programmable spatial function in order to compensate for reduced illumination near the image edges.

Next, the image data reaches a channel clip module 807, wherein the image may be divided into parts to be color corrected and parts not to be color corrected.

In a color correction module 808 the R, G and B values of the processed RGB image may be adjusted in order to achieve accurate color interpolation. This may be made by multiplying the incoming RGB image by an adjustment matrix.

The image data from the gain and offset module 804 is also sent into a sharpening module 809. In this sharpening module 809, a preliminary sharpening term is determined according to the description above. The preliminary sharpening term represents the high-frequency component of the image.

The preliminary sharpening term is sent to a threshold filter, according to the description above, where it is thresholded to form the final sharpening term S (FIGS. 1 and 7).

Next, the sharpening term S is added pixel-wise to the adjusted and color-corrected RGB image in an adder 811. It may be advantageous to add the sharpening term after the radial illumination correction module 806, the chan clip module 807 and the color correction module 808, since these modules affect the RGB image data in such a way that the sharpening term is likely to appear miscolored if being added before.

After that, the sharpened RGB image is sent to a gamma correction module 812. In this module the RGB values may be converted into non-linear counterparts in order to be reproduced correctly, e.g. when showing the image on a CRT screen.

Thereafter the image is transferred into a horizontal scaling module 813. In this module the image may be scaled down to a preferred number of columns.

Next, the image data is sent to a YUV conversion module 814. In this module RGB data may be transferred into YUV data (Y—luminance, U—chroma channel U, blue component, V—chroma channel V, red component).

Finally, before outputting the image data through the DMA I/F 802, the image data enters a vertical scaling module 815. In this module the image may be scaled down to a preferred number of rows.

There are two image analysis modules, both placed after the gain and offset 804 module; a block-based analysis module 816 for white balance and exposure statistics, and a histogram calculation module 817 for black-level calibration and histogram equalization.

Further, there are a Register bank 818 for configuration by a processor and an IRQ (IRQ—"interrupt request line") control module 819 for sending interrupt signals, IRQ.

In brief, the AVP is an example of an image pre-processor comprising the above mentioned modules, as well as other modules for image processing.

Figure 9:
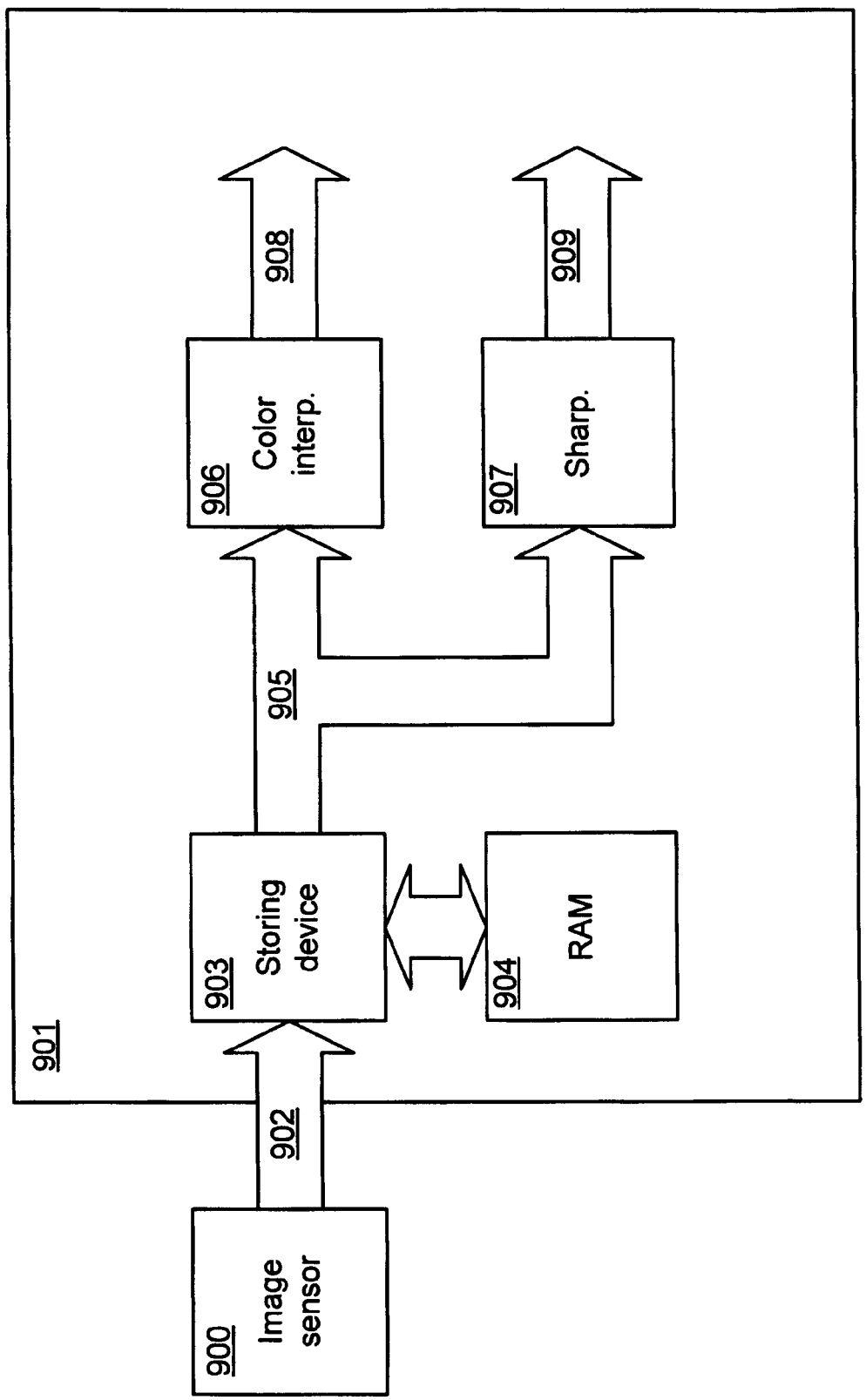
FIG. 9 schematically illustrates an image data input process.

Now, referring to FIG. 9, the image data input from an image sensor 900 to an AVP 901 is described in greater detail with respect to an exemplifying embodiment. The image sensor 900 and AVP 901 may be comprised in an image capturing device, for instance a camera-enabled mobile terminal (mobile phone, personal digital assistant, hand-held computer), a surveillance camera, a video recorder, etc.

In the exemplifying embodiment, the image data is read sequentially from the image sensor 900 via a 10-bit data bus 902 into a storing device 903. The storing device 903 is holding a 5×5 pixel set, wherein one of the rows is read directly from the image sensor 900 and the remaining four rows are read from a RAM (RAM—Random Access Memory) 904. When the 5×5 pixel set in the storing device 903 has been processed, new image data is input from the image sensor 900 into the storing device 903 and the RAM 904 is updated, in order to get the following 5×5 pixel set.

The 5×5 pixel set in the storing device 903 is transferred via a 5×5×10-bit data bus 905 into a color interpolation module 906, wherein the 5×5 pixel set is processed according to the previous description, and into a sharpening module 907, wherein the 5×5 pixel set is processed according to the previous description. The resulting color values from the color interpolation module 906 are output via a 10-bit data bus 908, and the resulting sharpening values from the sharpening module 907 are output via a 10-bit data bus 909.

In the color interpolation module 906, one color value, red, blue or green, of the middlemost pixel is determined for the present 5×5 pixel set. Thus, in order to get all three color values, three color interpolations have to be made, which means that the present 5×5 pixel set has to be available for three clock cycles. However, in the sharpening module 907 only one sharpening term is determined for the present 5×5 pixel set, and the additional cycles can be used to allow a more low-cost realization.

The Argus Video Pre-processor (AVP) 800/901 is further described in Appendix 1.

Scaling Modules

Figure 10:
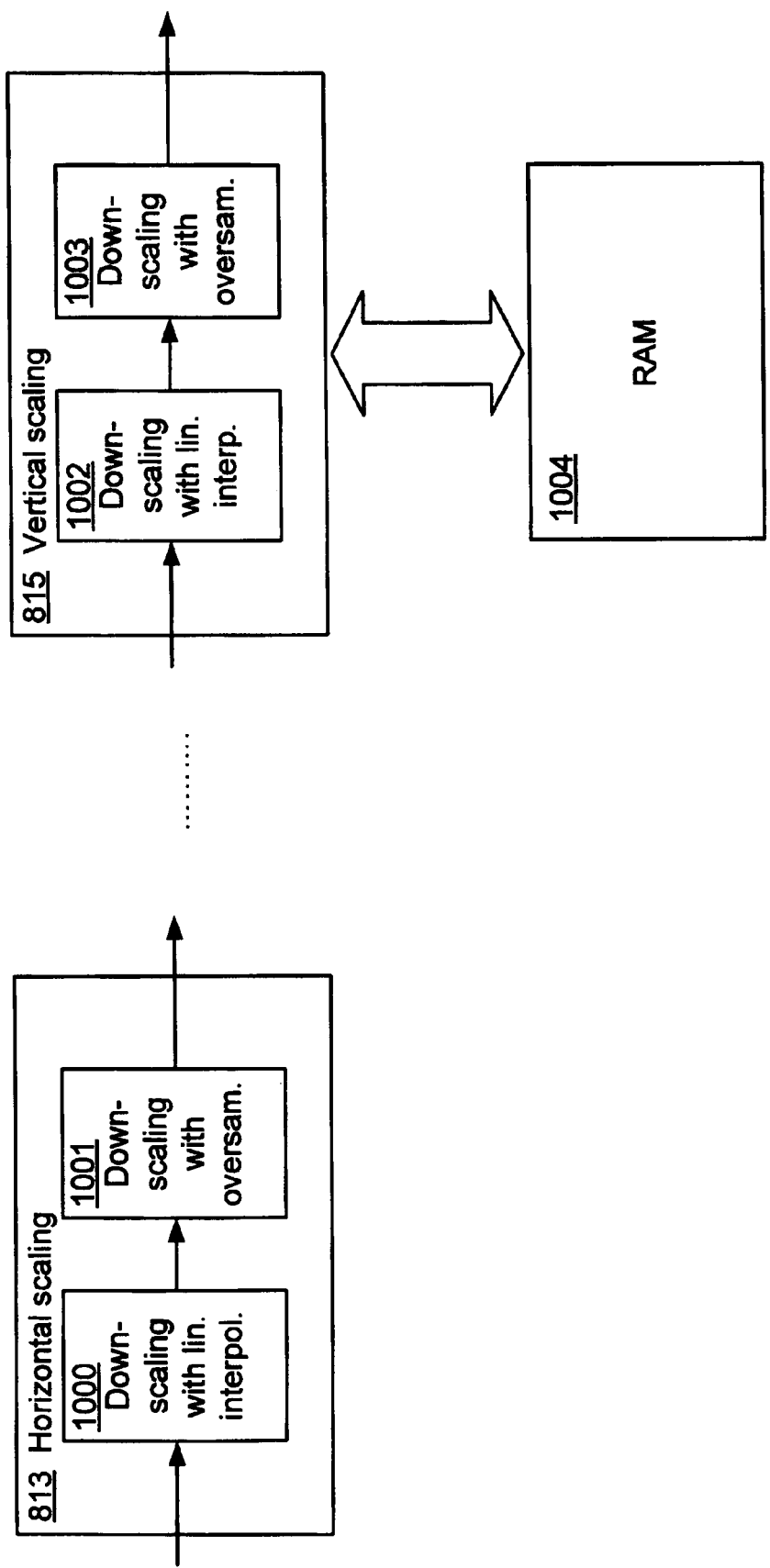
FIG. 10 schematically illustrates two scaling modules.

The two scaling modules, Horizontal scaling module 813 and Vertical scaling module 815, are further described in FIG. 10.

The reason why the YUV conversion is placed between the two modules, rather than before the scaling, is because fewer pixels have to be converted, which saves computing capacity.

Since the image data is transferred row by row, the vertical scaling module 815 has to store a number of rows in order to be able to scale down the image vertically. By placing the horizontal scaling module first of the two scaling modules, less data has to be stored in the vertical scaling module 815. Another advantage obtained by placing the horizontal scaling module 813 first is that fewer pixels have to be converted in the YUV conversion module 814.

Referring now to FIG. 10, the horizontal scaling module is further divided into two sub-module, a down-scaling with linear interpolation sub-module 1000 and a downscaling with oversampling sub-module 1001. By organizing the scaling into an interpolating step and an oversampling step, it is possible to attain a high-quality scaling with non-integer factors, while also benefiting from noise reduction due to oversampling at scale factors above two. Hence, the module is suitable as a zooming module.

The scaling factor of the sub-modules, sf, is:

$$sf = \frac{1}{2^{exp} \cdot \left(1 + \frac{frac}{256}\right)}$$

where exp is input to the downscaling with over-sampling sub-module 1001 and may contain 3 bits of data, and frac is input to the downscaling with linear interpolation sub-module 1000 and may contain 8 bits of data.

The downscaling with linear interpolation sub-module 1000 supports downscaling to (1+255/256), i.e. almost 2. If this is not enough the downscaling with oversampling sub-module 1001 is used.

The downscaling with linear interpolation sub-module 1000 has a pixel counter, containing the number of incoming pixels needed before outputting a value, a sub-pixel offset counter, denoted fracpos, and a register in order to keep the value of the previous pixel.

When a pixel value is input, the pixel counter is decreased by 1.

If the pixel counter is zero, a pixel value according to the following is output:

output=previous+fracpos[7:4]*(incoming−previous)/16 where output is the output value, previous is the value of the previous pixel stored in the register, fracpos[7:4] is the 4 most significant bits of the 8-bit frac factor above, and incoming is the pixel value of the incoming pixel.

In cases where a more accurate interpolation is needed more than the four most significant bits may be used.

However, this embodiment uses only the four most significant bits because the improvement obtained from using more bits is not perceivable by the human eye, and hence means unnecessary hardware cost.

For motion video, the scaling factor can be varied continuously from frame to frame to produce smooth zooming effects, with no perceivable glitches even when the exp parameter changes.

After outputting a value, the sub-pixel offset counter is increased by frac. The carry obtained by this operation, C, is used for updating the pixel counter:

pixel counter=pixel counter+C+1

In the downscaling with oversampling sub-module 1001, an average of a number of pixels is determined, hence the name "oversampling".

The sub-module 1001 comprises an accumulator summing up the incoming pixel values, a pixel counter counting the number of incoming pixels, and a barrel shifter for bit shifting, i.e. division by $2^{exp}$.

When a pixel value is input to the sub-module 1001 the accumulator is increased by the pixel value of the incoming pixel, and the pixel counter is increased by 1.

When the pixel counter is $2^{exp}$, the value of the accumulator divided by $2^{exp}$ is output, and, thereafter, the counter is set to zero and the accumulator is set to zero.

By summing up a number of pixels the noise is reduced efficiently.

The Vertical scaling module 815 also has a down-scaling with linear interpolation sub-module 1002 and a downscaling with oversampling sub-module 1003. The main difference between the Horizontal scaling module and the Vertical scaling module is that the Vertical scaling module has to store the previous pixel values in a RAM 1004.

In order to reduce the use of memory, the functions of the downscaling with linear interpolation 1002 and downscaling with oversampling 1003 are somewhat different.

When exp>0, the linear interpolation is put on hold and an average value of two pixels at a predetermined distance is determined instead. Hence, the use of memory is reduced, which is cost and power efficient.

However, it is possible to apply the same methods as in the Horizontal scaling module 813, but in order to do that a number of accumulators corresponding to the number of columns of the image are needed.

To sum up, the scaling in the AVP 800/901 is divided into a horizontal scaling module 813 and a vertical scaling module 815. Advantageously, the image data is first downscaled horizontally, since the data is input row by row. In the vertical scaling module 815, less data has to be stored since the image is already downscaled horizontally, i.e. less columns of the image have to be downscaled. Further, the scaling modules may be divided into a downscaling with linear interpolation sub-module 1002 and a downscaling with oversampling sub-module 1003, wherein the sub-module 1002 is used for downscaling in small steps, more particularly below 2, and the sub-module 1003 is used for downscaling in larger steps, more particularly in powers of 2.

Since the image data is read sequentially, row by row, it is advantageous to start down-scaling horizontally since no data storage is needed.

The invention has mainly been described above with reference to a few embodiments. However, as is readily appreciated by a person skilled in the art, other embodiments than the ones disclosed above are equally possible within the scope of the invention, as defined by the appended patent claims.

The description has been focused on hardware implementations for image processing. Such hardware may be realized by any known technique to convert a hardware description language (HDL), such as VHDL or Verilog, to hardware circuitry such as any type of programmable logic device (PLD), e.g. an FPGA, any type of gate array or any type of standard cell ASIC. Alternatively, the hardware circuitry may be realized by a full custom integrated circuit design or by discrete components. As an alternative, all or parts of the above image processing may be implemented by program code running on any commercially available microprocessor device such as a CPU ("Central Processing Unit"), a DSP ("Digital Signal Processor"), a microcontroller, a GPU ("Graphics Processing Unit"), etc. Unlike the hardware implementations in which all intermediate data and control parameters are calculated in parallel and output data is generated based on the control parameters, such as the above-mentioned orientation data (LDED/RDED or HED/VED), the software implementations would instead include decision steps in which the calculated control parameters are used to decide what data to calculate, process and/or output.

What is claimed is:

1. An image processing method, comprising:
   receiving a raw color image, as produced by an image sensor;
   generating a color image having a plurality of pixels by processing raw image data from said raw color image, wherein pixels for which color values are absent in said raw image data are assigned color values derived from present color values in said raw image data;
   generating a sharpening term by processing raw image data from said raw color image; and
   combining said color image with said sharpening term so as to produce an improved color image;
   wherein said generating a color image involves interpolating said assigned color values from said present color values in said raw image data;
   said generating a color image by interpolation comprises determining an orientation of said raw color image in order to adjust said interpolation according to said orientation; and
   wherein said orientation is determined by:
      determining a plurality of edge detection matrices corresponding to respective orientations including a vertical orientation and a horizontal orientation, said edge detection matrices being determined using said raw color image and respective convolution matrices corresponding to said respective orientations;
      determining a plurality of edge detection measures from said plurality of edge detection matrices; and
      determining said orientation based on comparing values of said plurality of edge detection measures; wherein:
   said plurality of edge detection matrices includes a horizontal edge detection matrix and a vertical edge detection matrix;
   said plurality of edge detection measures includes a horizontal edge detection measure and a vertical edge detection measure;
   if said horizontal edge detection measure is greater than twice said vertical edge detection measure, then said orientation is determined to be said horizontal orientation; and
   if said vertical edge detection measure is greater than twice said horizontal edge detection measure, then said orientation is determined to be said vertical orientation.

2. An image processing method according to claim 1, wherein said generating a color image and said generating a sharpening term are performed in parallel and independently of each other.

3. An image processing method according to claim 1, said generating a color image resulting in a number of single-color images, wherein said combining involves adding said sharpening term to each of said single-color images.

4. An image processing method according to claim 1, wherein said raw color image has a non-uniform distribution of color values for its pixels, such that color values belonging to a first color are more frequent than color values belonging to a second color.

5. An image processing method according to claim 4, wherein said first color is represented on every row of pixels in said raw color image.

6. An image processing method according to claim 5, wherein said first color is green.

7. An image processing method according to claim 1, wherein said raw color image is a Bayer image.

8. An image processing method according to claim 1, wherein said generating a color image by interpolation involves thresholding for reducing pattern artifacts and/or noise, wherein an input color value between a predetermined low threshold level and a predetermined high threshold level is output as zero, an input color value which is lower than said predetermined low threshold level is output as an output color value linearly dependent on said input color value, and an input color value which is higher than said pre-determined high threshold level is output as an output color value linearly dependent on said input color value.

9. An image processing method according to claim 1, wherein said generating a color image by interpolation involves a median calculation comprising:
   selecting a pixel set including pixels spatially close to a center pixel in said raw color image;
   determining a set of differences, wherein each of the elements in said set of differences corresponds to a difference in color value between two adjacent pixels in said pixel set;
   sorting said set of differences in descending or increasing order;
   determining an average value for the middlemost values in said sorted set of differences; and
   adding said average value to the color value of said center pixel.

10. An image processing method according to claim 9, wherein said pixel set is a part of a row or column of pixels in said raw color image.

11. An image processing method according to claim 1, wherein said generating a color image, said generating a sharpening term and said combining are performed on successive sub-windows of said raw color image.

12. An image processing method according to claim 1, wherein:
   said respective orientations also include a right diagonal orientation and a left diagonal orientation;
   said plurality of edge detection matrices also include a right diagonal edge detection matrix and a left diagonal edge detection matrix; and
   said plurality of edge detection measures also include a right diagonal edge detection measure, and a left diagonal edge detection measure.

13. An image processing method according to claim 12, wherein:
   said horizontal edge detection matrix is determined as a convolution between a horizontal weighting matrix and an absolute value of a convolution between said raw color image and a horizontal convolution matrix;
   said vertical edge detection matrix is determined as a convolution between a vertical weighting matrix and an absolute value of a convolution between said raw color image and a vertical convolution matrix;
   said right diagonal edge detection matrix is determined as a sum of a convolution between said raw color image and a first right diagonal convolution matrix and a convolution between said raw color image and a second right diagonal convolution matrix; and said left diagonal edge detection matrix is determined as a sum of a convolution between said raw color image and a first left diagonal convolution matrix and a convolution between said raw color image and a second left diagonal convolution matrix.

14. An image processing method according to claim 12, wherein:

said horizontal edge detection measure, said vertical edge detection measure, said right diagonal edge detection measure and said left diagonal edge detection measure are equivalent to a predetermined element of, respectively, said horizontal edge detection matrix, said vertical edge detection matrix, said right diagonal edge detection matrix and said left diagonal detection matrix.

15. An image processing method according to claim 12, wherein:

if said right diagonal edge detection measure is greater than twice said left diagonal edge detection measure, then said orientation is determined to be said right diagonal orientation; and if said left diagonal edge detection measure is greater than twice said right diagonal edge detection measure, then said orientation is determined to be said left diagonal orientation.

16. An image processing device comprising:

a receiving module configured to receive a raw color image as produced by an image sensor;

an interpolation module configured to generate a color image having a plurality of pixels by processing raw image data from said raw color image, wherein pixels for which color values are absent in said raw image data are assigned color values derived from present color values in said raw image data;

a sharpening module configured to generate a sharpening term by processing raw image data from said raw color image;

a combining module configured to combine said color image with said sharpening term so as to produce an improved color image; and an orientation detector which is configured to determine an orientation of said raw color image, wherein said interpolation module is configured to derive said assigned color values from said present color values in said raw image data as a function of the thus-determined orientation;

wherein said orientation detector is configured to determine said orientation by:

determining a plurality of edge detection matrices corresponding to respective orientations including a vertical orientation and a horizontal orientation, said edge detection matrices being determined using said raw color image and respective convolution matrices corresponding to said respective orientations;

determining a plurality of edge detection measures from said plurality of edge detection matrices; and determining said orientation based on comparing values of said plurality of edge detection measures; wherein:

said plurality of edge detection matrices includes a horizontal edge detection matrix and a vertical edge detection matrix;

said plurality of edge detection measures includes a horizontal edge detection measure and a vertical edge detection measure;

if said horizontal edge detection measure is greater than twice said vertical edge detection measure, then said orientation is determined to be said horizontal orientation; and if said vertical edge detection measure is greater than twice said horizontal edge detection measure, then said orientation is determined to be said vertical orientation.

17. An image processing device according to claim 16, wherein said interpolation module and said sharpening module are configured to operate in parallel and independently of each other.

18. An image processing device according to claim 16, wherein said interpolation module is configured to produce, as said color image, a number of single-color matrices, and wherein said combining module is configured to add said sharpening term to each of said single-color matrices.

19. An image processing device according to claim 16, wherein said interpolation module includes a thresholder which is configured to receive an input color value and to produce an output color value, wherein the output color value is zero when the input color value falls between a predetermined low threshold level and a predetermined high threshold level, the output color value is linearly dependent on the input color value when the input color value falls below said predetermined low threshold level, and the output color value is linearly dependent on the input color value when the input color value falls above said predetermined high threshold level.

20. An image processing device according to claim 16, wherein said interpolation module includes a median calculator which is configured to select a pixel set including pixels spatially close to a center pixel in said raw color image; determine a set of differences, wherein each of the elements in said set of differences corresponds to a difference in color value between two adjacent pixels in said pixel set; sort said set of differences in descending or increasing order; determine an average value for the middlemost values in said sorted set of differences; and add said average value to the color value of said center pixel.

21. An image processing device according to claim 16, which is comprised in an integrated circuit.

22. An image processing device according to claim 16, wherein:

said respective orientations also include a right diagonal orientation and a left diagonal orientation;

said plurality of edge detection matrices also include a right diagonal edge detection matrix and a left diagonal edge detection matrix; and said plurality of edge detection measures also include a right diagonal edge detection measure, and a left diagonal edge detection measure.

23. An image processing device according to claim 22, wherein:

said orientation detector is configured to determine said horizontal edge detection matrix as a convolution between a horizontal weighting matrix and an absolute value of a convolution between said raw color image and a horizontal convolution matrix;

said orientation detector is configured to determine said vertical edge detection matrix as a convolution between a vertical weighting matrix and an absolute value of a convolution between said raw color image and a vertical convolution matrix;

said orientation detector is configured to determine said right diagonal edge detection matrix as a sum of a convolution between said raw color image and a first right diagonal convolution matrix and a convolution between said raw color image and a second right diagonal convolution matrix; and said orientation detector is configured to determine said left diagonal edge detection matrix as a sum of a convolution between said raw color image and a first left diagonal convolution matrix and a convolution between said raw color image and a second left diagonal convolution matrix.

24. An image processing device according to claim 22, wherein:

said horizontal edge detection measure, said vertical edge detection measure, said right diagonal edge detection measure and said left diagonal edge detection measure are equivalent to a predetermined element of, respectively, said horizontal edge detection matrix, said vertical edge detection matrix, said right diagonal edge detection matrix and said left diagonal detection matrix.

25. An image processing device according to claim 22, wherein:

said orientation detector is configured to determine said orientation to be said right diagonal orientation if said right diagonal edge detection measure is greater than twice said left diagonal edge detection measure; and said orientation detector is configured to determine said orientation to be said left diagonal orientation if said left diagonal edge detection measure is greater than twice said right diagonal edge detection measure.

* * * * *